(12) United States Patent
Kakeno et al.

(10) Patent No.: US 10,056,626 B2
(45) Date of Patent: Aug. 21, 2018

(54) FUEL CELL SYSTEM, FUEL CELL VEHICLE, AND CONTROL METHOD FOR FUEL CELL SYSTEM

(71) Applicant: TOYOTA JIDOSHA KABUSHIKI KAISHA, Toyota-shi, Aichi-ken (JP)

(72) Inventors: Yuji Kakeno, Nisshin (JP); Mitsuhiro Nada, Toyota (JP); Kenji Umayahara, Miyoshi (JP); Yutaka Tano, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 337 days.

(21) Appl. No.: 14/939,478

(22) Filed: Nov. 12, 2015

(65) Prior Publication Data

US 2016/0141673 A1 May 19, 2016

(30) Foreign Application Priority Data

Nov. 14, 2014 (JP) ................................. 2014-231338

(51) Int. Cl.
*H01M 12/00* (2006.01)
*H01M 8/04313* (2016.01)
(Continued)

(52) U.S. Cl.
CPC ......... *H01M 8/04313* (2013.01); *B60L 1/003* (2013.01); *B60L 11/1803* (2013.01);
(Continued)

(58) Field of Classification Search
CPC ......... H01M 8/04313; H01M 8/04626; H01M 8/04925; H01M 16/006; H01M 8/04111;
(Continued)

(56) References Cited

U.S. PATENT DOCUMENTS

2008/0248351 A1 10/2008 Wake et al.
2011/0014536 A1 1/2011 Yoshida
(Continued)

FOREIGN PATENT DOCUMENTS

CN 102931422 A 2/2013
JP 2004-178965 A 6/2004
(Continued)

*Primary Examiner* — Gary Harris
(74) *Attorney, Agent, or Firm* — Finnegan, Henderson, Farabow, Garrett & Dunner, LLP

(57) ABSTRACT

A fuel cell system mounted in a vehicle includes a fuel cell supplying electric power to a motor driving the vehicle, a pump supplying oxygen to the fuel cell, an accelerator position detection unit detecting an accelerator depression amount of the vehicle, and a control unit calculating electric power required to be generated by the fuel cell and electric power required for driving of the pump based on the accelerator depression amount and controlling the pump based on the electric power required for the driving, in which the control unit calculates the electric power required for the driving such that a rate of increase in the electric power required for the driving exceeds a rate of increase in the electric power required to be generated when the calculated electric power required to be generated increases.

6 Claims, 12 Drawing Sheets

(51) Int. Cl.
  *B60L 1/00*       (2006.01)
  *B60L 11/18*      (2006.01)
  *H01M 8/04111*    (2016.01)
  *H01M 16/00*      (2006.01)
  *H01M 8/04858*    (2016.01)
  *H01M 8/04537*    (2016.01)

(52) U.S. Cl.
  CPC ....... *B60L 11/1861* (2013.01); *B60L 11/1887* (2013.01); *B60L 11/1898* (2013.01); *H01M 8/04111* (2013.01); *H01M 8/04626* (2013.01); *H01M 8/04925* (2013.01); *H01M 16/006* (2013.01); *B60L 2240/26* (2013.01); *B60L 2240/46* (2013.01); *B60L 2250/28* (2013.01); *B60L 2270/145* (2013.01); *H01M 2250/20* (2013.01); *H01M 2250/402* (2013.01); *Y02B 90/12* (2013.01); *Y02T 10/705* (2013.01); *Y02T 10/7044* (2013.01); *Y02T 10/7258* (2013.01); *Y02T 90/32* (2013.01); *Y02T 90/34* (2013.01)

(58) Field of Classification Search
  CPC .. B60L 11/1898; B60L 1/003; B60L 11/1887; B60L 11/1861; B60L 11/1803; Y02T 10/705; Y02T 90/32; Y02T 10/7258; Y02T 10/7044; Y02T 90/34; Y02B 90/12

USPC .......................................................... 429/9
  See application file for complete search history.

(56) References Cited

U.S. PATENT DOCUMENTS

| | | | |
|---|---|---|---|
| 2011/0293972 A1* | 12/2011 | Naganuma | B60L 11/1887 429/9 |
| 2012/0007545 A1 | 1/2012 | Yoshida et al. | |
| 2012/0021257 A1 | 1/2012 | Yoshida et al. | |
| 2012/0115055 A1 | 5/2012 | Wake et al. | |

FOREIGN PATENT DOCUMENTS

| | | |
|---|---|---|
| JP | 2006-312907 | 11/2006 |
| JP | 2008-130424 | 6/2008 |
| JP | 2009-44835 A | 2/2009 |
| JP | 2009-231223 | 10/2009 |
| JP | 2010-238528 | 10/2010 |
| JP | 2010-238530 | 10/2010 |
| JP | 2011-36101 A | 2/2011 |
| JP | 2011-142033 | 7/2011 |
| JP | 2012-099445 A | 5/2012 |
| JP | 2013-233051 | 11/2013 |
| JP | 2014-166110 | 9/2014 |
| WO | WO 2014/103823 A1 | 7/2014 |

* cited by examiner ic # FUEL CELL SYSTEM, FUEL CELL VEHICLE, AND CONTROL METHOD FOR FUEL CELL SYSTEM

INCORPORATION BY REFERENCE

The disclosure of Japanese Patent Application No. 2014-231338 filed on Nov. 14, 2014 including the specification, drawings and abstract is incorporated herein by reference in its entirety.

BACKGROUND OF THE INVENTION

1. Field of the Invention

The invention relates to a fuel cell system mounted in a vehicle, a fuel cell vehicle, and a control method for the fuel cell system.

2. Description of Related Art

A fuel cell system that is mounted in a vehicle, calculates electric power required to be generated by a fuel cell in accordance with an accelerator depression amount, and controls the amount of oxygen and the amount of hydrogen supplied to the fuel cell so that electric power generated by the fuel cell corresponds to the electric power required to be generated has been known (Japanese Patent Application Publication No. 2006-312907). This fuel cell system increases the rotational speed of an air compressor that supplies oxygen to the fuel cell when the electric power required to be generated by the fuel cell increases during the acceleration of the vehicle.

SUMMARY OF THE INVENTION

However, the air compressor is delayed in response due to inertia, and a delay occurs until the rotational speed of the compressor reaches a required rotational speed even when the electric power required to be generated rapidly increases as a result of a rapid increase in the accelerator depression amount or the like. This hinders the supply of sufficient electric power required for acceleration to a driving motor of the vehicle, and then a sense of acceleration with respect to the accelerator depression amount might be deteriorated. When a sudden acceleration of the vehicle is repeated, the supply of electric power from the secondary battery to the driving motor is repeated and the electric power storage amount (SOC) of the secondary battery is reduced. Then, the deterioration of the sense of acceleration might continue.

When the electric power generated by the fuel cell lags behind the electric power required to be generated due to a delayed response of the air compressor during the acceleration of the vehicle or the like as described above, the electric power that is supplied to the driving motor rapidly increases when the generated electric power rises steeply thereafter. This might lead to the occurrence of a temporary sudden acceleration (torque shock).

According to a first aspect of the invention, there is provided a fuel cell system mounted in a vehicle. This fuel cell system includes a fuel cell supplying electric power to a motor driving the vehicle, a pump supplying oxygen to the fuel cell, an accelerator position detection unit detecting an accelerator depression amount of the vehicle, and a control unit calculating electric power required to be generated by the fuel cell and electric power required for driving of the pump based on the accelerator depression amount and controlling the pump based on the electric power required for the driving. The control unit calculates the electric power required for the driving such that a rate of increase in the electric power required for the driving exceeds a rate of increase in the electric power required to be generated when the calculated electric power required to be generated increases. According to this aspect, the electric power required for the driving increases at a higher rate of increase than the electric power required to be generated when the electric power required to be generated increases, and thus generated electric power is unlikely to fall below the electric power required to be generated even when supply of required oxygen by a compressor lags behind the electric power required for the driving. Accordingly, deterioration of a sense of acceleration attributable to a failure of supply of electric power required for a driving motor can be reduced when the electric power required to be generated rapidly increases during acceleration of the vehicle or the like.

In the aspect described above, the control unit may correct a value of the electric power required for the driving by adding, to the electric power required for the driving calculated based on the accelerator depression amount, electric power used for compensating for lagging of a rotational speed of the motor behind the accelerator depression amount attributable to a vehicle weight of the vehicle and a rolling resistance of the vehicle and calculated by use of values set in advance as values respectively equivalent to the vehicle weight and the rolling resistance. According to this configuration, the electric power for compensating for the lagging of the rotational speed of the motor attributable to the vehicle weight and the rolling resistance is added to the electric power required for the driving, and thus the deterioration of the sense of acceleration with respect to the accelerator depression amount can be suppressed during the acceleration of the vehicle.

The fuel cell system according to the aspect described above may further include a secondary battery supplying electric power to the motor and the control unit may correct a value of the electric power required for the driving by adding, to the electric power required for the driving calculated based on the accelerator depression amount, electric power used for charging of the secondary battery and calculated by use of an upper limit value of charging electric power set in accordance with temperature and an electric power storage amount of the secondary battery. According to this configuration, the electric power used for the charging of the secondary battery is added to the electric power required for the driving, and thus a reduction in the electric power storage amount (SOC) of the secondary battery attributable to repetition of the acceleration of the fuel cell vehicle can be suppressed and the sense of acceleration can be allowed to continue for an extended period of time.

In the aspect described above, the control unit may correct a value of the electric power required to be generated such that, in a case where a difference between the electric power required to be generated and electric power actually generated by the fuel cell is equal to or greater than a first threshold and the electric power actually generated is equal to or less than a second threshold, the difference decreases with respect to the electric power required to be generated calculated based on the accelerator depression amount. According to this configuration, an increase in the difference between the electric power required to be generated and the generated electric power is suppressed even when the generated electric power lags behind the electric power required to be generated during the acceleration of the vehicle, and thus a rapid increase in electric power supplied to a traction motor is suppressed even when the generated electric power rises steeply thereafter. Accordingly, a torque shock during the acceleration of the vehicle can be suppressed.

According to a second aspect of the invention, there is provided a control method for a fuel cell system mounted in a vehicle, the fuel cell system having a fuel cell supplying electric power to a motor driving the vehicle and a pump supplying oxygen to the fuel cell, the control method including detecting an accelerator depression amount of the vehicle, calculating electric power required to be generated by the fuel cell and electric power required for driving of the pump based on the accelerator depression amount and controlling the pump based on the electric power required for the driving, and calculating the electric power required for the driving such that a rate of increase in the electric power required for the driving exceeds a rate of increase in the electric power required to be generated when the calculated electric power required to be generated increases. According to this aspect, effects similar to those of the first aspect can be achieved.

The invention can be carried out in various aspects. For example, the invention can take the form of a vehicle in which a fuel cell is mounted, a control method for a fuel cell system mounted in a vehicle, a control device executing this control method, a computer program executing this control method, a recording medium in which this computer program is recorded, or the like.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
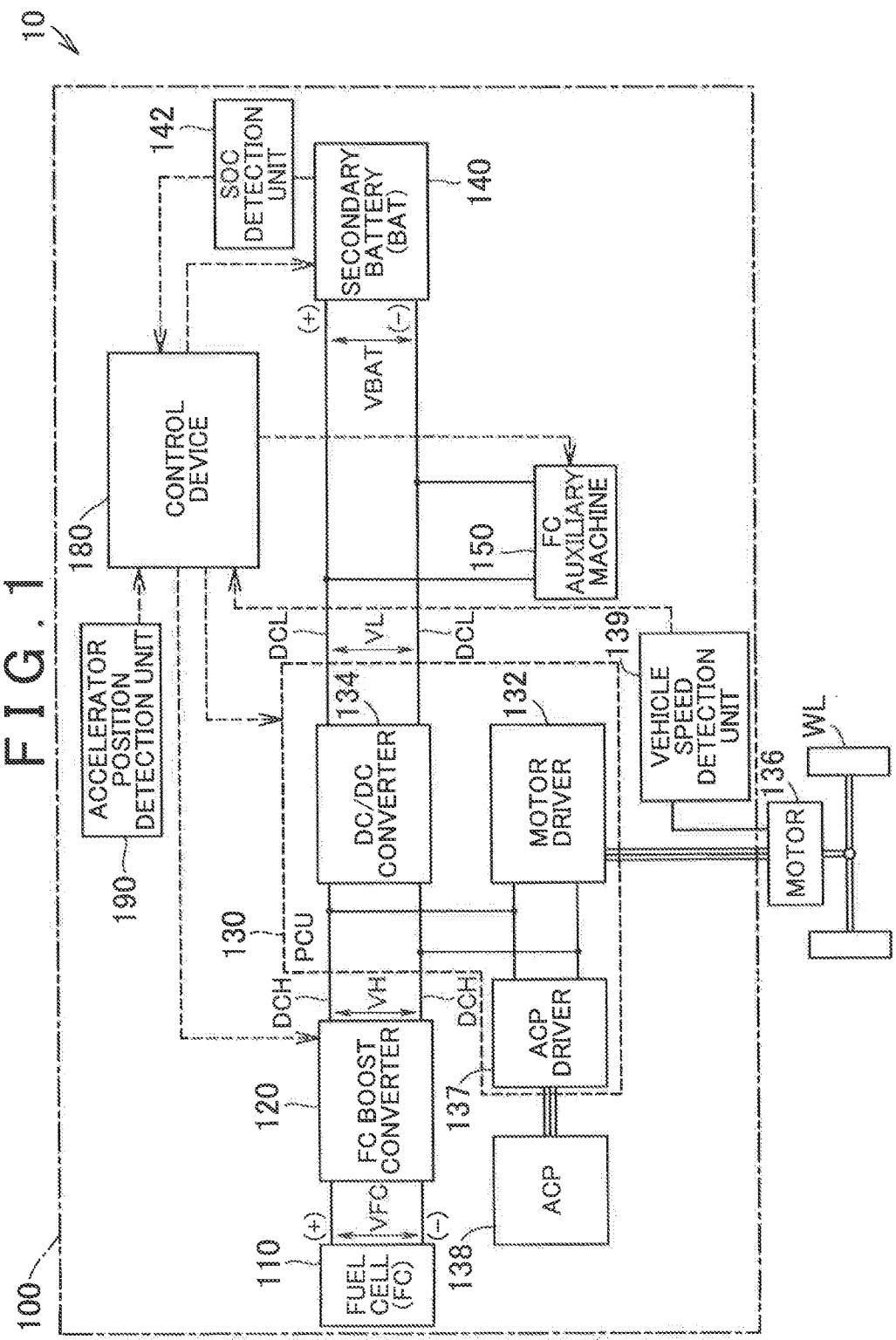
FIG. 1 is a schematic diagram of a fuel cell vehicle in which a fuel cell system according to a first embodiment is mounted.

FIG. 1 is a schematic diagram illustrating a configuration of a fuel cell vehicle 10 in which a fuel cell system 100 according to a first embodiment is mounted. The fuel cell vehicle 10 is provided with a fuel cell 110, a FC boost converter 120, a power control unit (PCU) 130, a traction motor 136, an air compressor (ACP) 138, a vehicle speed detection unit 139, a secondary battery 140, an SOC detection unit 142, an FC auxiliary machine 150, a control device 180, an accelerator position detection unit 190, and vehicle wheels WL. The fuel cell vehicle 10 travels when the traction motor 136 is driven by electric power that is supplied from the fuel cell 110 and the secondary battery 140. The functional units of the fuel cell vehicle 10 described above excluding, for example, the traction motor 136 and the vehicle wheels WL constitute the fuel cell system 100.

The fuel cell 110 is a solid polymer-type fuel cell that generates electric power by receiving the supply of hydrogen and oxygen as reaction gases. The fuel cell 110 is not limited to the solid polymer-type fuel cell. Various types of fuel cells other than the solid polymer-type fuel cell can be adopted as the fuel cell 110. The fuel cell 110 is connected to high-voltage DC wiring DCH via the EC boost converter 120, and is connected to a motor driver 132 and an ACP driver 137 included in the PCU 130 via the high-voltage DC wiring DCH. The PC boost converter 120 boosts an output voltage VFC of the fuel cell 110 to a high voltage VH that can be used by the motor driver 132 and the ACP driver 137.

A three-phase inverter circuit constitutes the motor driver 132. The motor driver 132 is connected to the traction motor 136. The motor driver 132 converts output electric power of the fuel cell 110 that is supplied via the FC boost converter 120 and output electric power of the secondary battery 140 that is supplied via a DC/DC converter 134 into three-phase AC electric power and supplies the three-phase AC electric power to the traction motor 136. A synchronous motor that is provided with a three-phase coil constitutes the traction motor 136. The traction motor 136 drives the vehicle wheels WL via a gear or the like. During the braking of the fuel cell vehicle 10, the traction motor 136 also functions as a generator that generates regenerative electric power by regenerating the kinetic energy of the fuel cell vehicle 10. The vehicle speed detection unit 139 detects the vehicle speed $S_{VHCL}$[km/h] of the fuel cell vehicle 10 and transmits the result of the detection to the control device 180.

The DC/DC converter 134 adjusts the voltage level of the high-voltage DC wiring DCH in response to a driving signal from the control device 180 and switches charging/discharging states of the secondary battery 140. In a case where the regenerative electric power is generated in the traction motor 136, this regenerative electric power is converted into DC electric power by the motor driver 132 and the secondary battery 140 is charged therewith via the DC/DC converter 134.

A three-phase inverter circuit constitutes the ACP driver 137. The ACP driver 137 is connected to the ACP 138. The ACP driver 137 converts the output electric power of the fuel cell 110 that is supplied via the FC boost converter 120 and the output electric power of the secondary battery 140 that is supplied via a DC/DC converter 134 into three-phase AC electric power and supplies the three-phase AC electric power to the ACP 138. A synchronous motor that is provided with a three-phase coil constitutes the ACP 138. The ACP 138 drives the motor in response to the supply of the electric power and supplies oxygen (air) that is used for electric power generation to the fuel cell 110.

The secondary battery 140 is an electric power storage device that is capable of storing electric power energy and repeating charging and discharging. The secondary battery 140 is configured as, for example, a lithium-ion battery. Various types of batteries other than the lithium-ion battery, such as a lead storage battery, a nickel-cadmium battery, and a nickel-hydrogen battery, can also be adopted as the secondary battery 140. The secondary battery 140 is connected to the DC/DC converter 134 included in the PCU 130 via low-voltage DC wiring DCL and is connected to the high-voltage DC wiring DCH via the DC/DC converter 134.

The SOC detection unit 142 detects an electric power storage amount (SOC) of the secondary battery 140 and transmits the result of the detection to the control device 180. The "electric power storage amount (SOC)" according to this specification means the ratio of the current remaining capacity of the secondary battery 140 to the maximum charging capacity of the secondary battery 140. The SOC detection unit 142 detects the temperature Tba, an output voltage V, and an output current I of the secondary battery 140 and detects the electric power storage amount (SOC) based on the detected values. The SOC detection unit 142 according to this embodiment transmits the temperature Tba of the secondary battery 140 to the control device 180 as well.

The FC auxiliary machine 150 is connected to the low-voltage DC wiring DC, and is driven by the electric power that is supplied from the fuel cell 110 and the secondary battery 140. The FC auxiliary machine 150 is auxiliary machinery for the electric power generation by the fuel cell 110, such as a fuel pump that supplies the reaction gas to the fuel cell 110 and a refrigerant pump that supplies a refrigerant to the fuel cell 110. The accelerator position detection unit 190 detects the amount by which an accelerator is depressed by a driver (accelerator depression amount $D_{ACC}$) [%] and transmits the result of the detection to the control device 180.

A microcomputer that is provided with a central processing unit and a main memory unit constitutes the control device 180. When the control device 180 detects an operation such as the driver's accelerator operation, the control device 180 controls the electric power generation by the fuel cell 110 and the charging and discharging of the secondary battery 140 in accordance with the content of the operation. The control device 180 generates the driving signal correlated with the accelerator depression amount $D_{ACC}$ and transmits the driving signal to each of the motor driver 132 and the DC/DC converter 134. The motor driver 132 causes the traction motor 136 to be driven to rotate in accordance with the accelerator depression amount $D_{ACC}$ by, for example, adjusting the pulse width of an AC voltage in accordance with the driving signal from the control device 180. The control device 180 is provided with a secondary battery assist control map and determines a secondary battery assist rate by using this map. The secondary battery assist control map shows a relationship between the ratio of electric power borne by the secondary battery 140 to electric power $P_{T/M}$ that is required for the traction motor 136 to be driven to rotate in accordance with the accelerator depression amount $D_{ACC}$ (secondary battery assist rate) and the temperature and the electric power storage amount (SOC) of the secondary battery 140.

Figure 2:
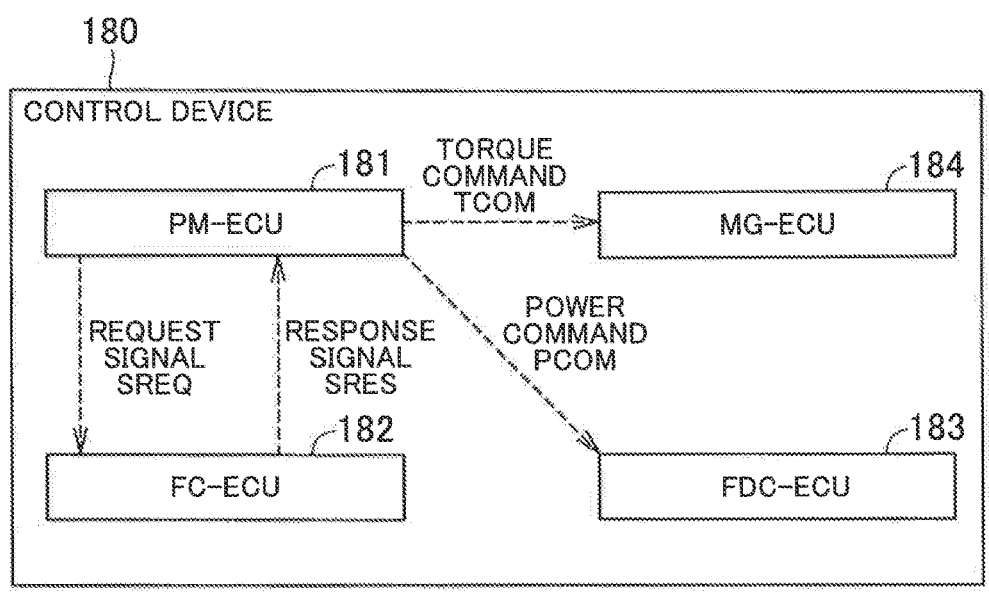
FIG. 2 is a diagram for showing a configuration of a control device.

FIG. 2 is a diagram for showing the configuration of the control device 180. The control device 180 includes four electronic control units (ECUs), that is, a PM-ECU 181, an FC-ECU 182, an FDC-ECU 183, and an MG-ECU 184. The PM-ECU 181 acquires the accelerator depression amount $D_{ACC}$ of the fuel cell vehicle 10 and issues, to the other ECUs, various requests and commands that are required for the traction motor 136 to be driven at a rotational speed correlated with the accelerator depression amount $D_{ACC}$. The FC-ECU 182 controls the fuel cell 110 and the FC auxiliary machine 150. When the PC-ECU 182 receives a request signal SREQ (described later) from the PM-ECU 181, the FC-ECU 182 issues a response signal SRES correlated with the electric power generation capacity and characteristics of the fuel cell 110 to the PM-ECU 181. The FDC-ECU 183 controls the PC boost converter 120. When the FDC-ECU 183 receives a power command PCOM (described later) from the PM-ECU 181, the FDC-ECU 183 supplies electric power correlated with the power command PCOM from the fuel cell 110 to the traction motor 136 and the ACP 138. The MG-ECU 184 controls the motor driver 132, the ACP driver 137, and the DC/DC converter 134. When the MG-ECU 184 receives a torque command TCOM (described later) from the PM-ECU 181, the MG-ECU 184 generates torque correlated with the torque command TCOM in the traction motor 136 and the ACP 138. An example of specific operations of the four ECUs will be described below.

When the accelerator pedal is depressed by the driver, the PM-ECU 181 receives the accelerator depression amount $D_{ACC}$ detected by the accelerator position detection unit 190. When the accelerator depression amount $D_{ACC}$ is received, the PM-ECU 181 calculates an accelerator torque demand $T_{ACC}$ [N·m] that is the amount of torque that the traction motor 136 requires in accordance with the accelerator depression amount $D_{ACC}$. The accelerator torque demand $T_{ACC}$ can be calculated from, for example, an arithmetic expression that shows a relationship between $D_{ACC}$ and $T_{ACC}$. In addition, the PM-ECU 181 calculates torque required for drivability $T_{MOD}$ [N·m] from the accelerator torque demand $T_{ACC}$. The torque required for drivability $T_{MOD}$ is calculated for the amount of change $\Delta T_{ACC}$ in the accelerator torque demand $T_{ACC}$ to be decreased, with rate processing (smoothing processing) performed on the amount of change $\Delta T_{ACC}$, in a case where the amount of change $\Delta T_{ACC}$ [N·m/s] in the accelerator torque demand $T_{ACC}$ is equal to or greater than a threshold (rate limiter) $\Delta THT_{ACC}$. The torque required for drivability $T_{MOD}$ is set because the acceleration and deceleration of the fuel cell vehicle 10 become steep and less comfortable when the acceleration and deceleration of the fuel cell vehicle 10 are controlled in correlation with the accelerator torque demand $T_{ACC}$. The PM-ECU 181 issues the torque command TCOM that includes the calculated torque required for drivability $T_{MOD}$ to the MG-ECU 184. When the MG-ECU 184 receives the torque command TCOM that includes the torque required for drivability $T_{MOD}$, the MG-ECU 184 controls the traction motor 136 so that output torque correlated with the torque required for drivability $T_{MOD}$ is generated. In this manner, the actual rotational speed (actual UM rotational speed) $R_{T/M}$ of the traction motor 136 approximates a rotational speed correlated with the torque required for drivability $T_{MOD}$ (required T/M rotational speed $R_{T/MRQ}$). Torque that is actually generated in the traction motor 136 will also be referred to as actual torque $T_{ACT}$. Electric power that is consumed by the traction motor 136 as a result of the generation of the actual torque will also be referred to as TN electric power consumption $P_{CONS}$.

The PM-ECU 181 calculates electric power required for the vehicle $P_{VHCL}$ [W] from the calculated torque required for drivability $T_{MOD}$. The electric power required for the vehicle $P_{VHCL}$ is electric power that is required for the fuel cell vehicle 10 to be put into an operation state correlated with the torque required for drivability $T_{MOD}$ and is electric power required to be generated by the fuel cell 110. The electric power required for the vehicle $P_{VHCL}$ is calculated from the following Equation (1).

$$P_{VHCL} = \max\{P_{T/M} + P_{AUX} + P_{chg}, P_{OC}\} \quad (1)$$

Herein, $P_{T/M}$ is electric power required for the driving of the traction motor 136 [W], $P_{AUX}$ [W] is electric power required for the driving of the FC auxiliary machine 150 and the ACP 138, and $P_{chg}$ [W] is electric power used for the charging and discharging of the secondary battery 140. $P_{OC}$ [W] is electric power required for a high potential avoidance voltage during an intermittent operation or the like. $P_{T/M}$ can be calculated from, for example, a motor characteristic that shows a relationship between the rotational speed and required torque of the traction motor 136 and $P_{T/M}$. $P_{AUX}$ can be calculated based on, for example, actually measured values of the current electric power consumption by the FC auxiliary machine 150 and the ACP 138. $P_{AUX}$ may also be calculated with the electric power consumption by the FC auxiliary machine 150 being a constant and the electric power consumption by the ACP 138 being calculated from a motor characteristic that shows a relationship between the rotational speed and required torque of the motor and the electric power consumption. $P_{chg}$ can be calculated from, for example, a map that shows a relationship among a target SOC (such as 60%), the current SOC, and $P_{chg}$ regarding the secondary battery 140. $P_{OC}$ can be calculated from the high potential avoidance voltage, the electric power-current characteristic (P-I characteristic) of the fuel cell 110, and the current-voltage characteristic (I-V characteristic) of the fuel cell 110. $P_{OC}$ may be a fixed value. The "electric power required for the vehicle $P_{VHCL}$" is one example of the "electric power required to be generated" according to the scope of claims.

When the FC-ECU 182 receives the request signal SREQ including the electric power required for the vehicle $P_{VHCL}$, the FC-ECU 182 determines whether or not the electric power required for the vehicle $P_{VHCL}$ exceeds allowable electric power $P_{ALW}$ [W] of the fuel cell 110. The allowable electric power $P_{ALW}$ is an upper limit value of the electric power that can be currently generated by the fuel cell 110. The allowable electric power $P_{ALW}$ can be calculated from various parameters that show the current state of the fuel cell 110. Examples of the parameters that show the current state of the fuel cell 110 include the temperature of the fuel cell 110, the amount of outside air that is taken in by the ACP 138, the amount of hydrogen that remains in a hydrogen tank which stores the hydrogen supplied to the fuel cell 110, and the anode pressure and cathode pressure of the fuel cell 110. The FC-ECU 182 can calculate the allowable electric power $P_{ALW}$ from a map that shows a correspondence relationship between these parameters and the allowable electric power $P_{ALW}$. When the electric, power required for the vehicle $P_{VHCL}$ does not exceed the allowable electric power $P_{ALW}$, the FC-ECU 182 issues, to the PM-ECU 181, the response signal SRES that includes the current value I [A] and the voltage value V [V] correlated with the electric power required for the vehicle $P_{VHCL}$. The current value I and the voltage value V correlated with the electric power required for the vehicle $P_{VHCL}$ can be calculated from the P-I characteristic and the I-V characteristic of the fuel cell 110. When the electric power required for the vehicle $P_{VHCL}$ exceeds the allowable electric power $P_{ALW}$, the FC ECU 182 issues, to the PM-ECU 181, the response signal SRES that includes the current value I and the voltage value V correlated with the allowable electric power $P_{ALW}$.

When the PM-ECU 181 receives the response signal SRES that includes the current value I and the voltage value V correlated with the electric power required for the vehicle $P_{VHCL}$ or the allowable electric power $P_{ALW}$, the PM-ECU 181 issues the received current value I and the voltage value V to the FDC-ECU 183 as the power command PCOM. When the PDC-ECU 183 receives the power command PCOM, the FDC-ECU 183 controls the PC boost converter 120 so that the fuel cell 110 outputs the current value I and the voltage value V correlated with the power command PCOM. The electric power that is actually output by the fuel cell 110 will also be referred to as PC-generating electric power $P_{FC}$ [W].

The PM-ECU 181 calculates electric power required for ACP driving $P_{RQ}$ [W] from the accelerator torque demand $T_{ACC}$. The electric power required for ACP driving $P_{RQ}$ is electric power that is required for the ACP 138 to be put into a driving state correlated with the accelerator torque demand $T_{ACC}$. The electric power required for ACP driving $P_{RQ}$ can be calculated from, for example, an arithmetic expression that shows a relationship between $T_{ACC}$ and $P_{RQ}$. The PM-ECU 181 issues, to the PC-ECU 182, the request signal SREQ that includes the calculated electric power required for ACP driving $P_{RQ}$. The "electric power required for ACP driving $P_{RQ}$" is one example of the "electric power required for driving" according to the scope of claims.

When the FC-ECU 182 receives the request signal SREQ that includes the electric power required for ACP driving $P_{RQ}$, the FC-ECU 182 calculates the rotational speed $R_{RQ}$ [rpm] of the ACP 138 which is correlated with the electric power required for ACP driving $P_{RQ}$ (required ACP rotational speed). The required rotational speed $R_{RQ}$ can be calculated by, for example, the following method. Firstly, the current value I of the fuel cell 110 that is required for the generation of the electric power required for ACP driving $P_{RQ}$ is calculated from the value of the electric power required for ACP driving $P_{RQ}$ and the P-I characteristic and I-V characteristic of the fuel cell 110. Then, the amount of oxygen that is required for the generation of the electric power required for ACP driving $P_{RQ}$ is calculated from a charge amount correlated with the calculated current value I and an electrochemical reaction formula pertaining to electric power generation. Then, the amount of air that is required for the generation of the electric power required for ACP driving $P_{RQ}$ is calculated from the calculated oxygen amount and an air component ratio. Then, the required rotational speed $R_{RQ}$ of the ACP 138 is calculated from the calculated air amount. The FC-ECU 182 issues, to the PM-ECU 181, the response signal SRES that includes the calculated required rotational speed $R_{RQ}$.

When the PM-ECU 181 receives the response signal SRES that includes the required rotational speed $R_{RQ}$, the PM-ECU 181 calculates an ACP torque demand $T_{ACP}$ [N·m] from the required rotational speed $R_{RQ}$. The PM-ECU 181 issues, to the MG-ECU 184, the torque command TCOM that includes the calculated ACP torque demand $T_{ACP}$.

When the MG-ECU 184 receives the torque command TCOM that includes the ACP torque demand $T_{ACP}$, the MG-ECU 184 controls the ACP 138 so that output torque correlated with the ACP torque demand $T_{ACP}$ is generated, in this manner, the PM-ECU 181 allows the actual rotational speed of the ACP (actual ACP rotational speed) $R_{ACT}$ to approximate the required ACP rotational speed $R_{RQ}$.

As described above, the PM-ECU 181 according to this embodiment is configured to calculate the electric power required for the vehicle $P_{VHCL}$ from the torque required for drivability $T_{MOD}$ and calculate the electric power required for ACP driving $P_{RQ}$ from the accelerator torque demand $T_{ACC}$. According to this configuration, the rate of increase in the electric power required for ACP driving $P_{RQ}$ can exceed the rate of increase in the electric power required to be generated (electric power required for the vehicle $P_{VHCL}$) when the calculated electric power required for the vehicle $P_{VHCL}$, that is, the electric power required to be generated by the fuel cell 110 increases. Then, the deterioration of the sense of acceleration regarding the vehicle attributable to a delayed reaction of the air compressor can be reduced during a sudden acceleration of the vehicle, that is, during a rapid increase in the electric power required for the vehicle $P_{VHCL}$. Specifically, the ACP 138 is delayed in response due to inertia, and a delay occurs until the ACP 138 reaches a correlated rotational speed even when the electric power required for ACP driving $P_{RQ}$ increases as a result of a rapid increase in the electric power required for the vehicle $P_{VHCL}$. In the related art, this hinders the supply of sufficient electric power required for the traction motor of the vehicle and causes the sense of acceleration with respect to the accelerator depression amount to be deteriorated. According to the configuration of this embodiment, however, the rate of increase in the electric power required for ACP driving $P_{RQ}$ exceeds the rate of increase in the electric power required for the vehicle $P_{VHCL}$, and thus the amount of oxygen that the ACP 138 supplies with a delay with respect to the electric power required for ACP driving $P_{RQ}$ approximates the amount of air that is required for the electric power required for the vehicle $P_{VHCL}$ at that point in time. Accordingly, a state where the FC-generating electric power $P_{FC}$ falls below the electric power required for the vehicle $P_{VHCL}$ due to the lack of supply of required oxygen becomes less likely to occur, and a state where the sense of acceleration is deteriorated with the electric power required fir the traction motor 136 insufficiently supplied becomes less likely to occur.

Figure 3:
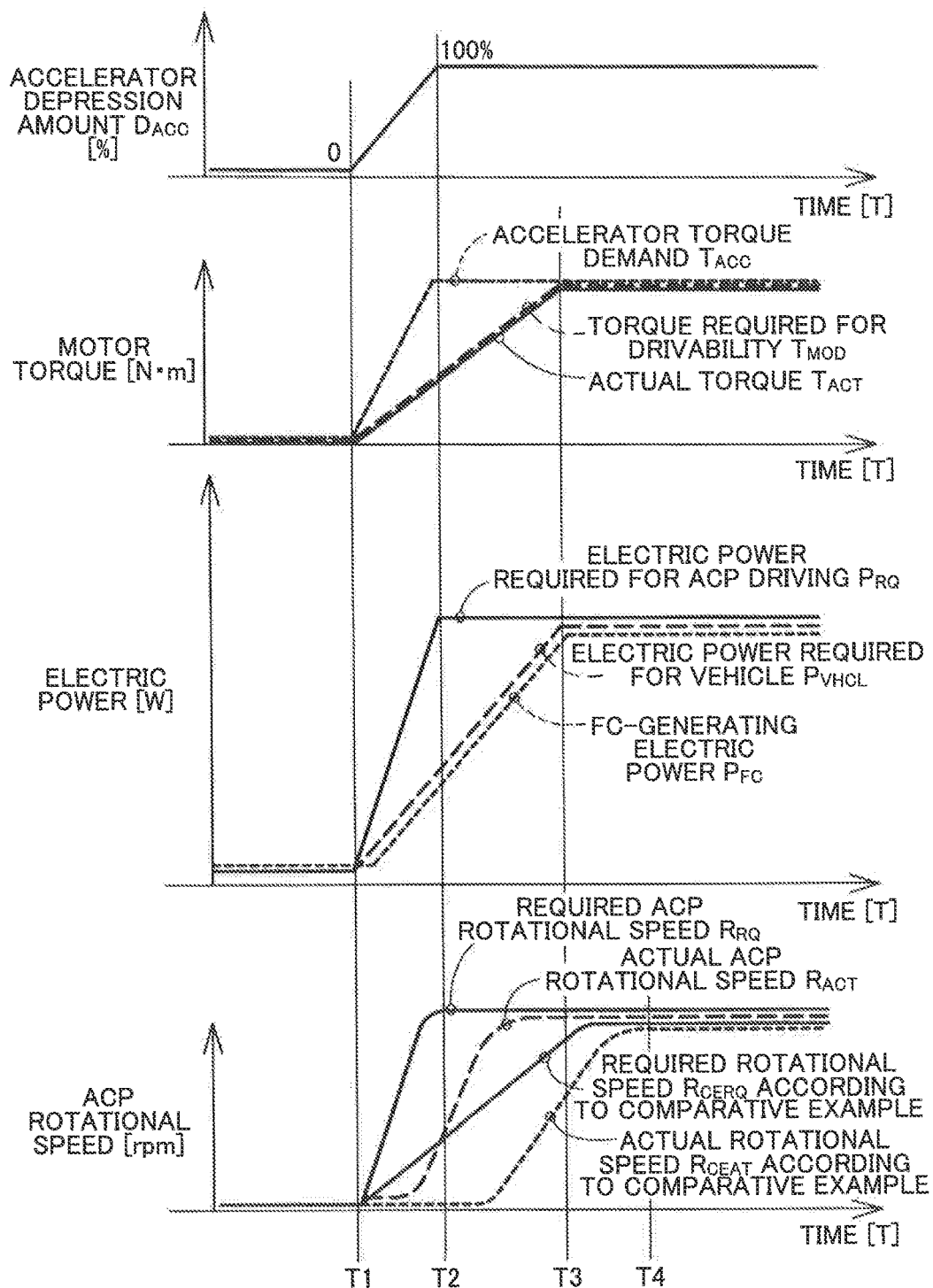
FIG. 3 is a timing chart illustrating an example of a state of the fuel cell vehicle according to the first embodiment.

FIG. 3 is a timing chart illustrating an example of a state of the fuel cell vehicle 10 according to this embodiment. FIG. 3 illustrates examples of time series variations in the accelerator depression amount $D_{ACC}$, the accelerator torque demand $T_{ACC}$, the torque required for drivability $T_{MOD}$, the actual torque $T_{ACT}$, the electric power required for ACP driving $P_{RQ}$, the electric power required for the vehicle $P_{VHCL}$, the FC-generating electric power $P_{FC}$, the required ACP rotational speed $R_{RQ}$, and the actual ACP rotational speed $R_{ACT}$. FIG. 3 also illustrates, as a Comparative Example 1, examples of a required ACP rotational speed (required rotational speed $R_{CERQ}$ according to the comparative example) and an actual ACP rotational speed (actual rotational speed $R_{CEAT}$ according to the comparative example) pertaining to a case where the electric power required for ACP driving $P_{RQ}$ is calculated from the torque required for drivability $T_{MOD}$. Herein, it is assumed that the driver sharply depresses the accelerator in the period of T1 to T2.

The accelerator torque demand $T_{ACC}$ is correlated with the accelerator depression amount $D_{ACC}$, and thus increases in the period of T1 to T2. The torque required for drivability $T_{MOD}$ is rate-processed with respect to the accelerator torque demand $T_{ACC}$, and thus more gently increases than the accelerator torque demand $T_{ACC}$. The electric power required for the vehicle $P_{VHCL}$, the PC-generating electric power $P_{FC}$, and the actual torque $T_{ACT}$ are correlated with the torque required for drivability $T_{MOD}$, and thus gently increases as well over the period of T1 to T3. The electric power required for ACP driving $P_{RQ}$ is correlated with the accelerator torque demand $T_{ACC}$, and thus increases over the period of T1 to T2.

The required rotational speed $R_{RQ}$ is correlated with the electric power required for ACP driving $P_{RQ}$, and thus increases in the period of T1 to T2. The actual ACP rotational speed $R_{ACT}$ lags behind the required ACP rotational speed $R_{RQ}$, and thus increases in the period of T1 to T3 herein. As a result, the rate of increase in the actual ACP rotational speed $R_{ACT}$ approximates the rate of increase in the electric power required for the vehicle $P_{VHCL}$ more than the actual ACP rotational speed $R_{CEAT}$ according to the comparative example. In other words, the amount of air that the ACP 138 supplies with a delay with respect to the required ACP rotational speed $R_{RQ}$ approximates the amount of air required for the electric power required for the vehicle $P_{VHCL}$ at that point in time. Accordingly, the FC-generating electric power $P_{FC}$ can be inhibited from falling below the electric power required for the vehicle $P_{VHCL}$.

In the Comparative Example 1, the required ACP rotational speed $R_{CERQ}$ according to the comparative example is correlated with the torque required for drivability $T_{MOD}$, and thus increases over the period of T1 to T3. Accordingly, the actual ACP rotational speed $R_{CEAT}$ according to the comparative example increases over the period of T1 to T4 herein. As a result, the rate of increase in the actual ACP rotational speed $R_{CEAT}$ according to the comparative example significantly lags behind the rate of increase in the electric power required for the vehicle $P_{VHCL}$. In other words, the amount of air that the ACP 138 supplies with a delay with respect to the required rotational speed $R_{CERQ}$ according to the comparative example becomes less than the amount of air required for the electric power required for the vehicle $P_{VHCL}$ at that point in time, and the FC-generating electric power $P_{FC}$ falls below the electric power required for the vehicle $P_{VHCL}$.

Figure 4:
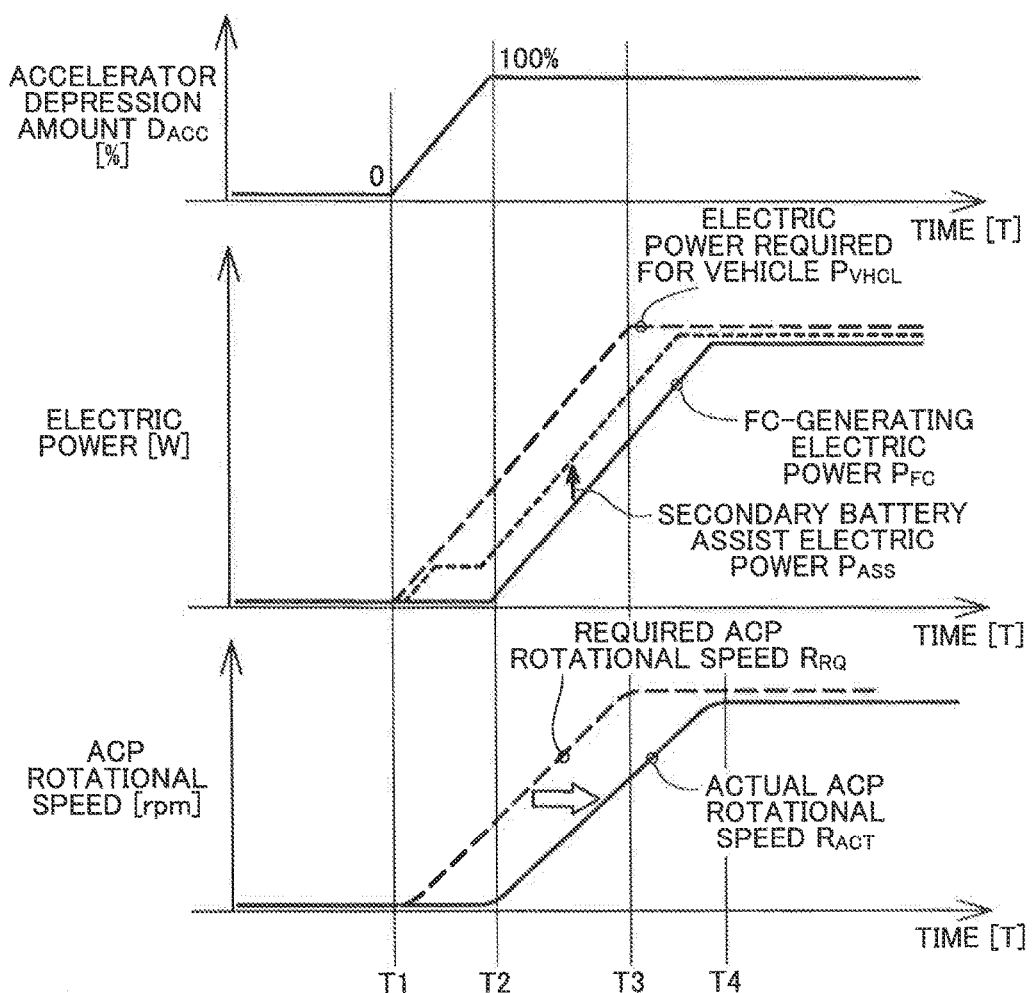
FIG. 4 is a timing chart illustrating an example of a state of a fuel cell vehicle according to a Comparative Example 1.

FIG. 4 is a timing chart illustrating an example of a state of a fuel cell vehicle according to the Comparative Example 1. FIG. 4 illustrates examples of time series variations in the accelerator depression amount $D_{ACC}$, the electric power required for the vehicle $P_{VHCL}$, the FC-generating electric power $P_{FC}$, secondary battery assist electric power $P_{ASS}$, and the electric power required for ACP driving $P_{RQ}$. The fuel cell vehicle according to the Comparative Example 1 is identical to the fuel cell vehicle 10 according to this embodiment except that the electric power required for ACP driving $P_{RQ}$ is calculated from the torque required for drivability $T_{MOD}$ as described above. As described above, in the fuel cell vehicle according to the Comparative Example 1, the FC-generating electric power $P_{FC}$ falls below the electric power required for the vehicle $P_{VHCL}$ during a rapid increase in the accelerator depression amount $D_{ACC}$ as described above. Accordingly, the supply of the electric power that is required for the traction motor 136 becomes insufficient, and thus the actual torque is reduced with respect to the torque required for drivability. Then, the sense of acceleration with respect to the accelerator depression amount is deteriorated, in addition, in a case where the FC-generating electric power $P_{FC}$ falls short of the electric power required for the vehicle $P_{VHCL}$, the assist electric power $P_{ASS}$, which is at least part of the output electric power $P_{out}$ of the secondary battery 140, is supplied to the traction motor 136 so that part of the shortfall is assisted. When the sudden acceleration of the vehicle is repeated, however, the supply of the assist electric power $P_{ASS}$ from the secondary battery to the traction motor is repeated to cause the electric power storage amount (SOC) of the secondary battery to be reduced and the deterioration of the sense of acceleration to continue. Meanwhile, in the fuel cell vehicle 10 according to this embodiment, the amount of air supplied by the ACP 138 approximates the amount of air that is required for the electric power required for the vehicle $P_{VHCL}$ at that point in time even when the actual rotational speed of the ACP 138 lags behind the required ACP rotational speed $R_{RQ}$, and thus the FC-generating electric power $P_{FC}$ can be inhibited from falling below the electric power required for the vehicle $P_{VHCL}$. Accordingly, the occurrence of a state where the supply of the electric power required for the traction motor 136 becomes insufficient can be suppressed during a rapid increase in the accelerator depression amount $D_{ACC}$, and the deterioration of the sense of acceleration can be suppressed. In addition, the supply of the assist electric power $P_{ASS}$ from the secondary battery to the traction motor can be suppressed, and thus a reduction in the electric power storage amount (SOC) of the secondary battery attributable to the repetition of the sudden acceleration of the vehicle can be suppressed.

According to the fuel cell vehicle 10 of this embodiment described above, the electric power required for ACP driving $P_{RQ}$ increases at a higher rate of increase than the electric power required to be generated when the electric power required to be generated (electric power required for the vehicle $P_{VHCL}$) rapidly increases, and thus generated electric power is unlikely to fall below the electric power required to be generated even when the supply of required oxygen by the ACP 138 is delayed with respect to the electric power required for driving. Accordingly, the deterioration of the sense of acceleration attributable to the failure of supply of the electric power required for the traction motor 136 can be reduced when the electric power required to be generated rapidly increases during the acceleration of the vehicle or the like.

A PM-ECU 181A according to a second embodiment suppresses the deterioration of the sense of acceleration regarding the vehicle attributable to the delayed reaction of the ACP 138 by calculating the electric power required for ACP driving $P_{RQ}$ from the accelerator torque demand $T_{ACC}$ as is the case with the PM-ECU 181 according to the first embodiment. In addition, the PM-ECU 181A according to the second embodiment suppresses the deterioration of the sense of acceleration attributable to the vehicle weight and rolling resistance of the fuel cell vehicle 10 by executing correction processing for correcting the value of the electric power required for ACP driving $P_{RQ}$ during the sudden acceleration of the vehicle. Specifically, the PM-ECU 181A according to the second embodiment executes the correction processing for correcting the value of the electric power required for ACP driving $P_{RQ}$ when a pre-set condition is satisfied as a condition for a rapid increase in the T/M electric power consumption $P_{CONS}$ by the traction motor 136. An initiating condition of the correction processing will be described later. During the correction processing, the PM-ECU 181A corrects the value of the electric power required for ACP driving $P_{RQ}$ by adding electric power for compensating for the lagging of the rotational speed of the traction motor 136 behind the accelerator depression amount $D_{ACC}$ attributable to the vehicle weight and rolling resistance of the fuel cell vehicle 10 to the electric power required for ACP driving $P_{RQ}$ calculated from the accelerator torque demand $T_{ACC}$.

Firstly, the PM-ECU 181A calculates a force (driving force) $F_{Tacc}$ that is generated in the fuel cell vehicle 10 by the accelerator torque demand $T_{ACC}$ by using the accelerator torque demand $T_{ACC}$. Then, a predicted acceleration $A_{EXP}$ of the fuel cell vehicle 10 is calculated by the use of the calculated $F_{Tacc}$ and the following Equation (2).

$$F_{Tacc} + F_{RR} = M_{VHCL} \cdot A_{EXP} \tag{2}$$

Herein, $F_{RR}$ is a value that is set in advance as a value equivalent to the rolling resistance of the fuel cell vehicle 10. $M_{VHCL}$ is a value that is set in advance as a value equivalent to the vehicle weight of the fuel cell vehicle 10. The PM-ECU 181A calculates a predicted rotational speed $R_{EXP}$ of the traction motor 136 by integrating the calculated predicted acceleration $A_{EXP}$. The PM-ECU 181A corrects the electric power required for ACP driving $P_{RQ}$ based on the predicted rotational speed $R_{EXP}$. Examples of a method for correcting the electric power required for ACP driving $P_{RQ}$ based on the predicted rotational speed $R_{EXP}$ may include the calculation of a correction amount from the predicted rotational speed $R_{EXP}$ using a map that shows a relationship between the predicted rotational speed $R_{EXP}$ and the correction amount (additional electric power).

Figure 5:
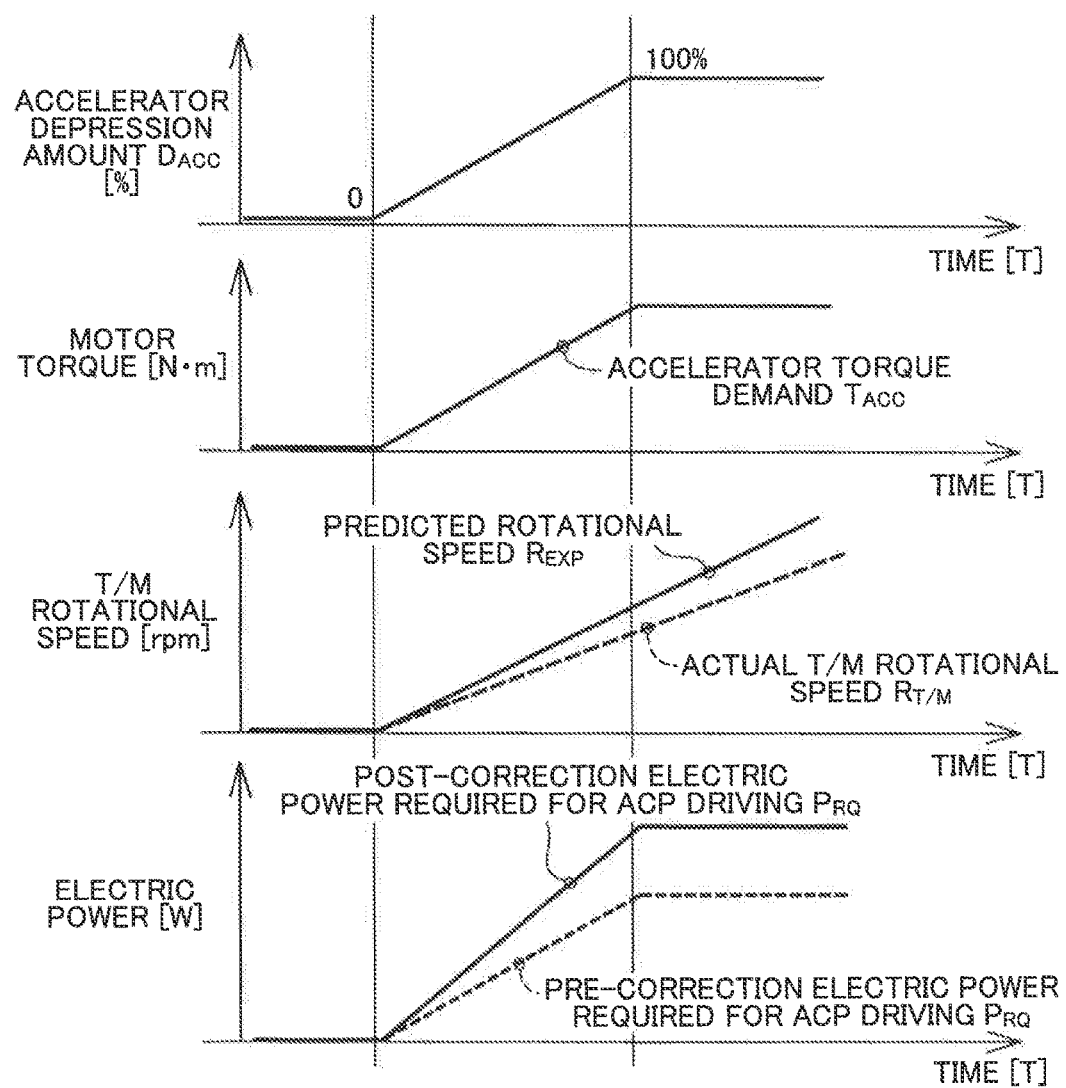
FIG. 5 is a timing chart illustrating an example of a state of a fuel cell vehicle according to a second embodiment.

FIG. 5 is a timing chart illustrating an example of a state of a fuel cell vehicle 10A according to the second embodiment. FIG. 5 illustrates examples of time series variations in the accelerator depression amount $D_{ACC}$, the accelerator torque demand $T_{ACC}$, the predicted rotational speed $R_{EXP}$, the actual T/M rotational speed $R_{T/M}$, the post-correction electric power required for ACP driving $P_{RQ}$, and the pre-correction electric power required for ACP driving $P_{RQ}$. The pre-correction electric power required for ACP driving $P_{RQ}$ is the electric power required for ACP driving $P_{RQ}$ according to the first embodiment. The post-correction electric power required for ACP driving $P_{RQ}$ is a value that exceeds the pre-correction electric power required for ACP driving $P_{RQ}$ because electric power equivalent to the amount of increase in the predicted rotational speed $R_{EXP}$ with respect to the actual T/M rotational speed $R_{T/M}$ is added thereto. According to the fuel cell vehicle 10A of the second embodiment, the deterioration of the sense of acceleration attributable to the weight and rolling resistance of the fuel cell vehicle 10 can be suppressed. Accordingly, the deterioration of the sense of acceleration with respect to the accelerator depression amount can be further reduced during the acceleration of the vehicle.

Figure 6:
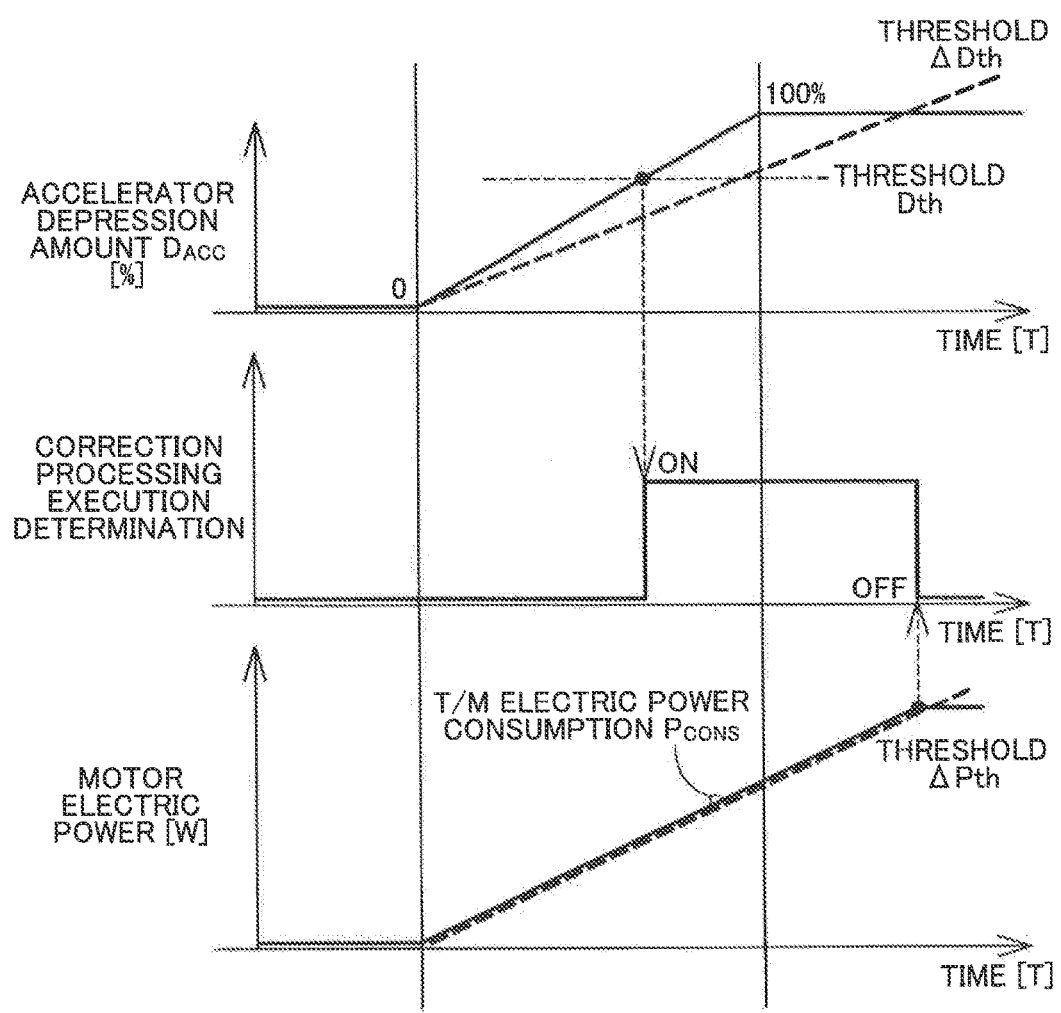
FIG. 6 is a timing chart illustrating examples of an initiating condition and a stopping condition of correction processing.

FIG. 6 is a timing chart illustrating examples of the initiating condition and a stopping condition of the correction processing. FIG. 6 illustrates example of time series variations in the accelerator depression amount $D_{ACC}$, the execution or non-execution of the correction processing, and the T/M electric, power consumption $P_{CONS}$. Herein, a period between the rate of increase in the accelerator depression amount $D_{ACC}$, that is, the width of increase $\Delta D_{ACC}$ [%/s] per unit time becoming at least a threshold $\Delta$Dth and the accelerator depression amount $D_{ACC}$ becoming at least a threshold Dth and the rate of increase in the T/M electric power consumption $P_{CONS}$ by the traction motor 136, that is, the width of increase $\Delta P_{CONS}$ [%/s] per unit time becoming equal to or less than a threshold $\Delta$Pth is set as the "condition for a rapid increase in the T/M electric power consumption $P_{CONS}$". In other words, the PM-ECU 181A according to the second embodiment initiates the correction processing when the width of increase $\Delta D_{ACC}$ in the accelerator depression amount $D_{ACC}$ per unit time becomes at least the threshold $\Delta$Dth and the accelerator depression amount $D_{ACC}$ becomes at least the threshold Dth and stops the correction processing when the width of increase $\Delta P_{CONS}$ in the T/M electric power consumption $P_{CONS}$ per unit time becomes equal to or less than the threshold $\Delta$Pth. In this manner, a state where the T/M electric power consumption $P_{CONS}$ rapidly increases can be easily detected. The "condition for a rapid increase in the T/M electric power consumption $P_{CONS}$" is not limited thereto, and any condition can be set as the "condition for a rapid increase in the T/M electric power consumption $P_{CONS}$".

A PM-ECU 181B according to a third embodiment suppresses the deterioration of the sense of acceleration regarding the vehicle attributable to the delayed reaction of the ACP 138 by calculating the electric power required for ACP driving $P_{RQ}$ from the accelerator torque demand $T_{ACC}$ as is the case with the PM-ECU 181 according to the first embodiment. In addition, the PM-ECU 181B according to the third embodiment suppresses a reduction in the electric power storage amount (SOC) of the secondary battery 140 attributable to the repetition of the acceleration of the fuel cell vehicle 10 by executing the correction processing for correcting the value of the electric power required for ACP driving $P_{RQ}$ in a case where the secondary battery 140 can still be charged. Specifically, the PM-ECU 181B according to the third embodiment executes the correction processing for correcting the value of the electric power required for ACP driving $P_{RQ}$ when a preset condition is satisfied as a condition for a rapid increase in the T/M electric power consumption $P_{CONS}$ by the traction motor 136. The initiating condition and the stopping condition of the correction processing are identical to those of the second embodiment (FIG. 6). During the correction processing, the PM-ECU 181B corrects the value of the electric power required for driving by adding electric power (charging electric power $P_{in}$) for the charging of the secondary battery 140 to the electric power required for ACP driving $P_{RQ}$ calculated from the accelerator torque demand $T_{ACC}$. Herein, the PM-ECU 181B calculates an upper limit value $P_{Win}$ [W] of the charging electric power that is set in accordance with the temperature and the electric power storage amount of the secondary battery 140 and adds the charging electric power $P_{in}$ equivalent to the upper limit value $P_{Win}$ to the electric power required for ACP driving $P_{RQ}$. The charging electric power $P_{in}$ may be equal to or less than the upper limit value $P_{Win}$.

$P_{Win}$ can be calculated from the SOC charging and discharging characteristics and the temperature charging and discharging characteristics of the secondary battery 140. The SOC charging and discharging characteristics refer to a map in which the electric power storage amount (SOC) of the secondary battery 140 is associated with an allowable input upper limit value $W_{in}$ of the input (charging) electric power $P_{in}$ and an allowable output upper limit value $W_{out}$ of the output (discharged) electric power $P_{out}$. The temperature charging and discharging characteristics refer to a map in which the temperature Tba of the secondary battery 140 is associated with the allowable input upper limit value $W_{in}$ of the input electric power and the allowable output upper limit value $W_{out}$ of the output electric power. The PM-ECU 181B can adopt, as $P_{Win}$ the smaller one of the allowable input upper limit value $W_{in}$ that is identified from the electric power storage amount (SOC) acquired from the SOC detection unit 142 and the SOC charging and discharging characteristics and the allowable input upper limit value $W_{in}$ that is identified from the temperature Tba acquired from the SOC detection unit 142 and the temperature charging and discharging characteristics.

Figure 7:
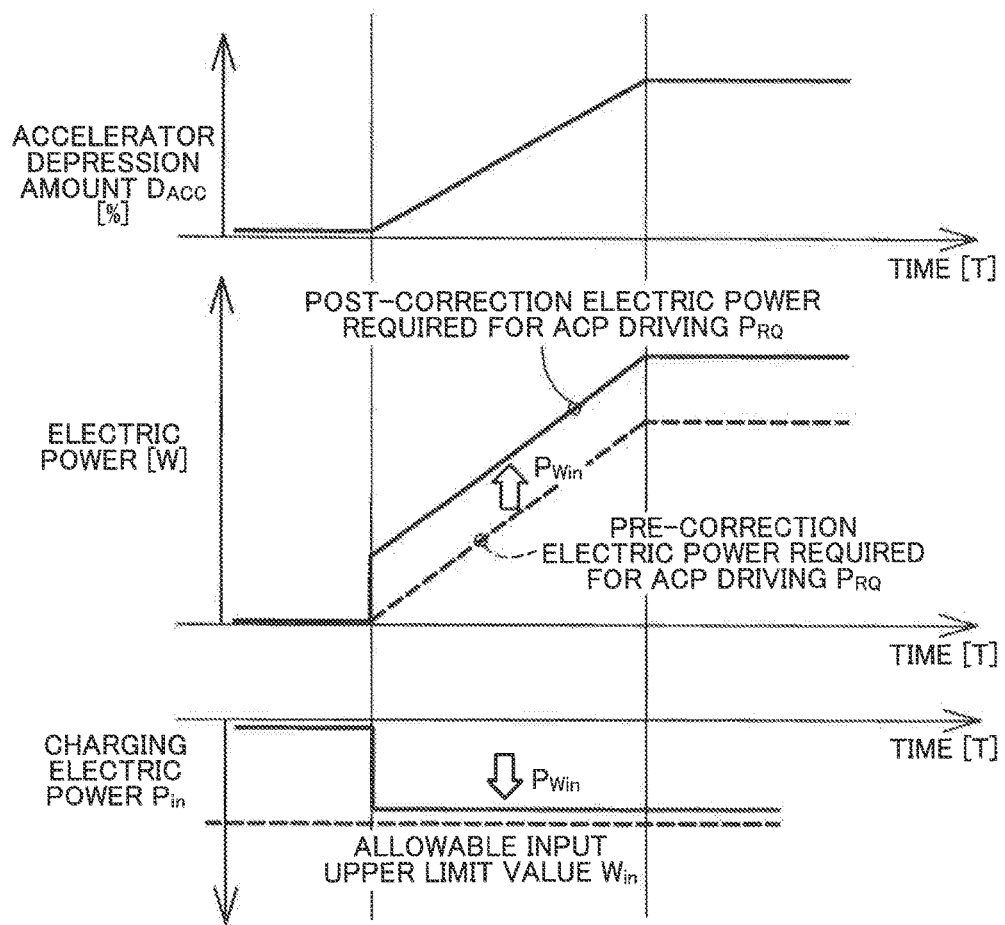
FIG. 7 is a timing chart illustrating an example of a state of a fuel cell vehicle according to a third embodiment.

FIG. 7 is a timing chart illustrating an example of a state of a fuel cell vehicle 10B according to the third embodiment. FIG. 7 illustrates examples of time series variations in the accelerator depression amount $D_{ACC}$, the post-correction electric power required for ACP driving $P_{RQ}$, the pre-correction electric power required for ACP driving $P_{RQ}$, and the charging electric power $P_{in}$ for the secondary battery. The pre-correction electric power required for ACP driving $P_{10}$ is the electric power required for ACP driving $P_{RQ}$ according to the first embodiment. The post-correction electric power required for ACP driving $P_{RQ}$ is a value that exceeds the pre-correction electric power required for ACP driving $P_{RQ}$ because electric power equivalent to the charging electric power $P_{in}$ for the secondary battery is added thereto. According to the fuel cell vehicle 10B of the third embodiment, the increment in the electric power required for ACP driving $P_{RQ}$ can be supplied to the secondary battery 140, and thus a reduction in the electric power storage amount (SOC) of the secondary battery 140 attributable to the repetition of the acceleration of the fuel cell vehicle 10 can be suppressed and the sense of acceleration can be allowed to continue for an extended period of time.

A fuel cell vehicle 10C according to a fourth embodiment is identical to the fuel cell vehicle 10 according to the first embodiment except that the fuel cell vehicle 10C according to the fourth embodiment performs torque shock avoidance control for suppressing a torque shock during the acceleration of the fuel cell vehicle. The torque shock during the acceleration of the fuel cell vehicle occurs, for example, as follows. At the initiation of the acceleration of the fuel cell vehicle, the FC-generating electric power $P_{FC}$ lags behind the electric power required to be generated (electric power required for the vehicle $P_{VHCL}$) and the electric power supplied to the traction motor is subjected to a temporary shortage. Then, when the FC-generating electric power $P_{FC}$ rises steeply, the electric power supplied to the traction motor rapidly increases. Then, the actual torque rapidly increases and a temporary sudden acceleration (torque shock) occurs. A PM-ECU 181C according to the fourth embodiment executes the torque shock avoidance control when a pre-set condition is satisfied as a condition for the occurrence of the torque shock during acceleration. The "condition for the occurrence of the torque shock during acceleration" will be described later. During the torque shock avoidance control, the PM-ECU 181C corrects the electric power required for the vehicle $P_{VHCL}$ by a method similar to that in the first embodiment so that the difference (shortfall) DIF between the electric power required for the vehicle $P_{VHCL}$ and the FC-generating electric power $P_{FC}$ decreases with respect to the calculated electric power required for the vehicle $P_{VHCL}$. Herein, the value of the electric power required for the vehicle $P_{VHCL}$ is reduced by applying a rate limit to the electric power required for the vehicle $P_{VHCL}$.

Figure 8:
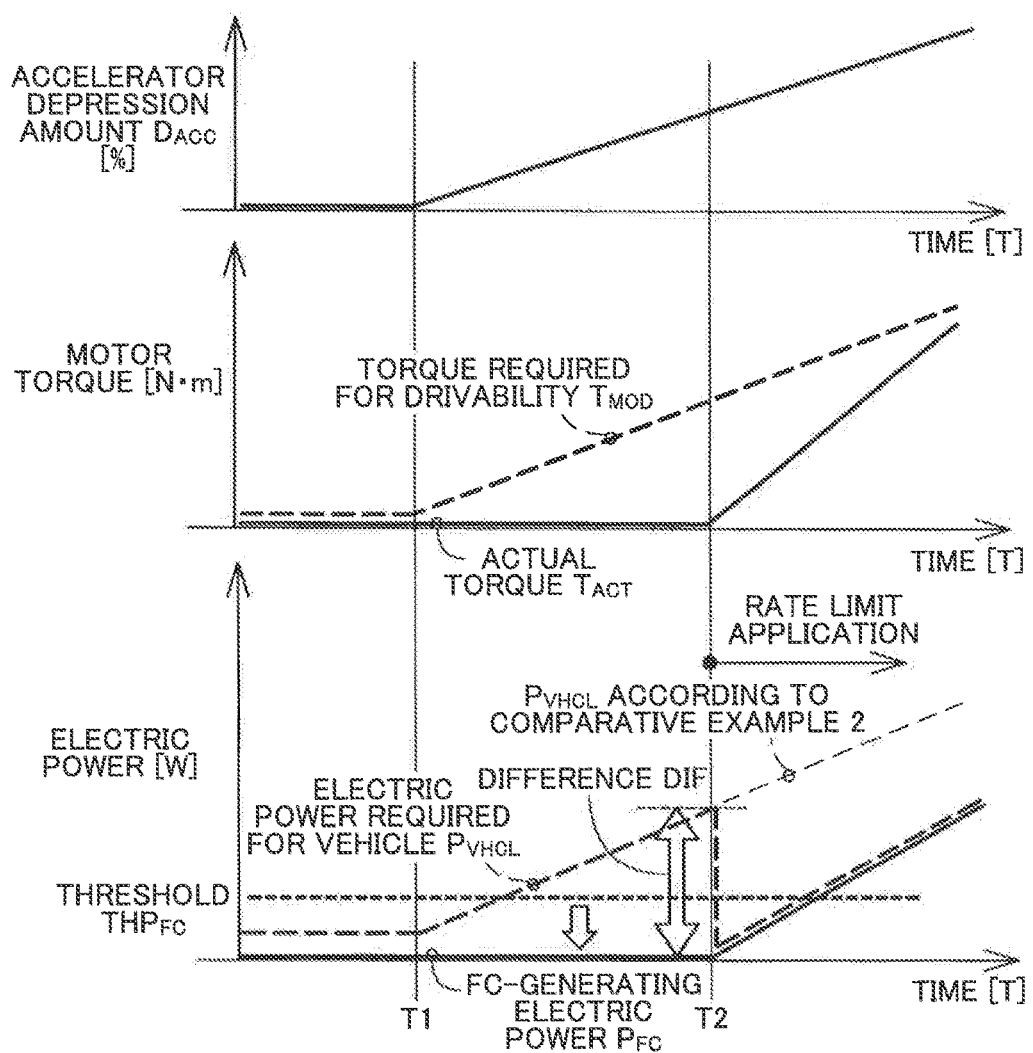
FIG. 8 is a timing chart illustrating an example of a state of a fuel cell vehicle according to a fourth embodiment.

FIG. 8 is a timing chart illustrating an example of a state of the fuel cell vehicle 10C according to the fourth embodiment. FIG. 8 illustrates examples of time series variations in the accelerator depression amount $D_{ACC}$, the torque required for drivability $T_{MOD}$, the actual torque $T_{ACT}$, the electric power required for the vehicle $P_{VHCL}$, and the FC-generating electric power $P_{FC}$. FIG. 8 also illustrates, as a Comparative Example 2, part of the electric power required for the vehicle $P_{VHCL}$ pertaining to a case where the rate limit is not applied. In the period of T1 to T2, the electric power required for the vehicle $P_{VHCL}$ increases with an increase in the torque required for drivability $T_{MOD}$. The FC-generating electric power $P_{FC}$ rarely increases during the same period because the FC-generating electric power $P_{FC}$ lags behind the electric power required tar the vehicle $P_{VHCL}$. Accordingly, in the period of T1 to T2, the difference DIF between the electric power required for the vehicle $P_{VHCL}$ and the FC-generating electric power $P_{FC}$ increases.

Herein, the FC-generating electric power $P_{FC}$ becoming equal to or less than a threshold $THP_{FC}$ ($THP_{FC} \geq P_{FC}$) and the difference DIP between the electric power required for the vehicle $P_{VHCL}$ and the FC-generating electric power $P_{FC}$ becoming at least a threshold $TH_{DIF}$ ($DIF \geq TH_{DIF}$) is set as the "condition for the occurrence of the torque shock during acceleration". The "threshold $THP_{FC}$" is one example of the "second threshold" according to the scope of claims and the "threshold $TH_{DIF}$" is one example of the "first threshold" according to the scope of claims. The "threshold $THP_{FC}$" and the "threshold $TH_{DIF}$" are obtained by an experiment or the like and by identifying a timing at which the FC-generating electric power $P_{FC}$ rises steeply.

Herein, this condition is satisfied at the point in time of T2. When the condition described above is determined to be satisfied at the point in time of T2, the PM-ECU 181C applies the rate limit to the electric power required for the vehicle $P_{VHCL}$. As the rate limit herein, the calculated electric power required for the vehicle $P_{VHCL}$ is substituted with the FC-generating electric power $P_{FC}$ and is raised at a rate value (fixed value) RD [W/ms] set from the value. The rate limit is not limited thereto. For example, the pre-set rate value (fixed value) RD [W/ms] may be subtracted from the calculated electric power required for the vehicle $P_{VHCL}$. In this manner, the value of the electric power required for the vehicle $P_{VHCL}$ decreases and the difference DIF between the electric power required for the vehicle $P_{VHCL}$ and the FC-generating electric power $P_{FC}$ decreases after the point in time of T2. Then, the electric power supplied to the traction motor does not increase rapidly even when the FC-generating electric power $P_{FC}$ rises steeply up to the value of the electric power required for the vehicle $P_{VHCL}$, and thus the actual torque does not increase rapidly and the occurrence of the torque shock is suppressed. The value of the electric power required for the vehicle $P_{VHCL}$ according to the Comparative Example 2 does not decrease even after the point in time of T2, and thus the difference DIF between the electric power required for the vehicle $P_{VHCL}$ and the FC-generating electric power $P_{FC}$ does not decrease.

Figure 9:
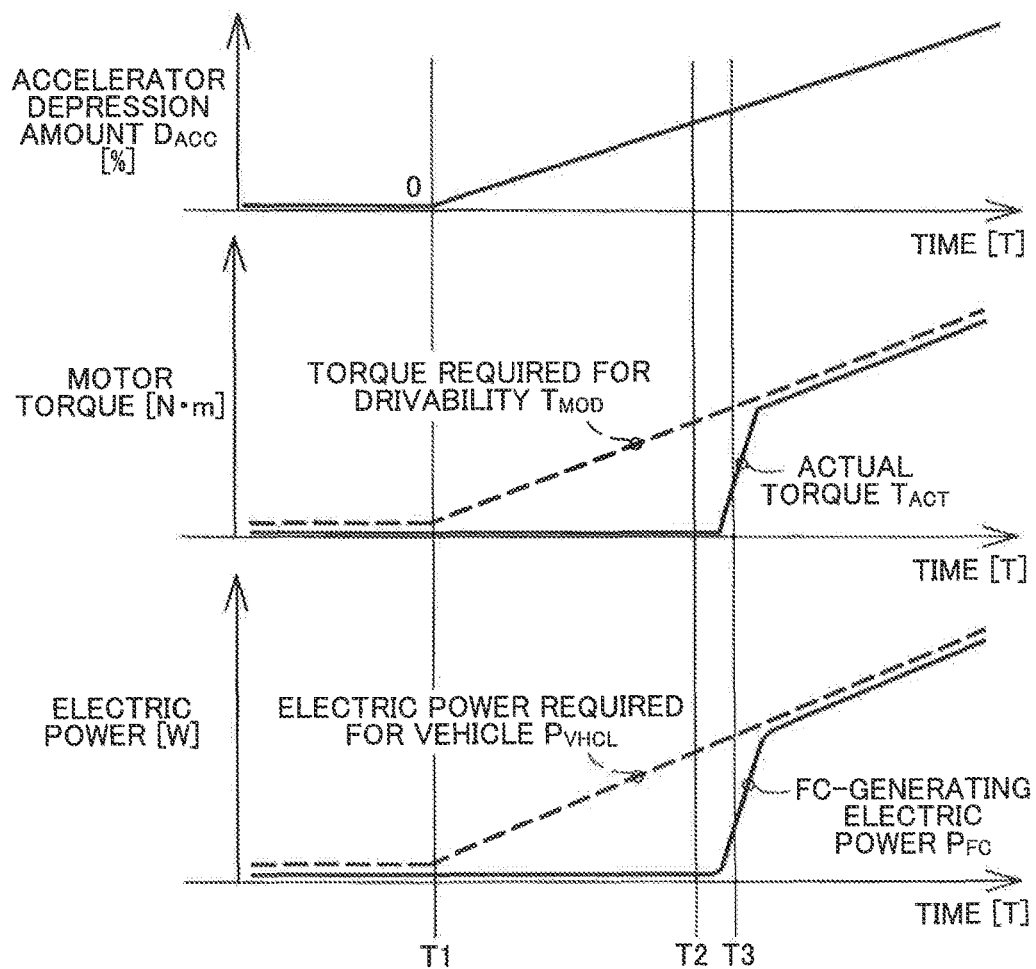
FIG. 9 is a timing chart illustrating an example of a state of a fuel cell vehicle according to a Comparative Example 2.

FIG. 9 is a timing chart illustrating an example of a state of a fuel cell vehicle according to the Comparative Example 2. FIG. 9 illustrates examples of time series variations in the accelerator depression amount $D_{ACC}$, the torque required for drivability $T_{MOD}$, the actual torque $T_{ACT}$, the electric power required for the vehicle $P_{VHCL}$, and the FC-generating electric power $P_{FC}$. The fuel cell vehicle according to the Comparative Example 2 is identical to the fuel cell vehicle 10C according to the fourth embodiment except that the fuel cell vehicle according to the Comparative Example 2 does not execute the torque shock avoidance control. As described above, in the fuel cell vehicle according to the Comparative Example 2, the rate limit is not applied to the electric power required for the vehicle $P_{VHCL}$ at the point in time of T2, and thus the difference DIF does not decrease at the point in time of T2. Accordingly, when the FC-generating electric power $P_{FC}$ rises steeply up to the value of the electric power required for the vehicle $P_{VHCL}$ at the point in time of T3 thereafter, the actual torque rapidly increases and the torque shock occurs. Meanwhile, according to the fuel cell vehicle 10C of this embodiment, the occurrence of the torque shock is suppressed because an increase in the difference DIF is suppressed by the torque shock avoidance control.

A PM-ECU 181D according to a fifth embodiment executes the torque shock avoidance control as is the case with that of the fourth embodiment. According to the description of the fourth embodiment, the rate value RD is a fixed value. However, the fifth embodiment is configured for the rate value RD to change depending on the length of time that elapses from the satisfaction of the "condition for the occurrence of the torque shock during acceleration". Except for this point, the fifth embodiment is identical in configuration to the fourth embodiment.

Figure 10:
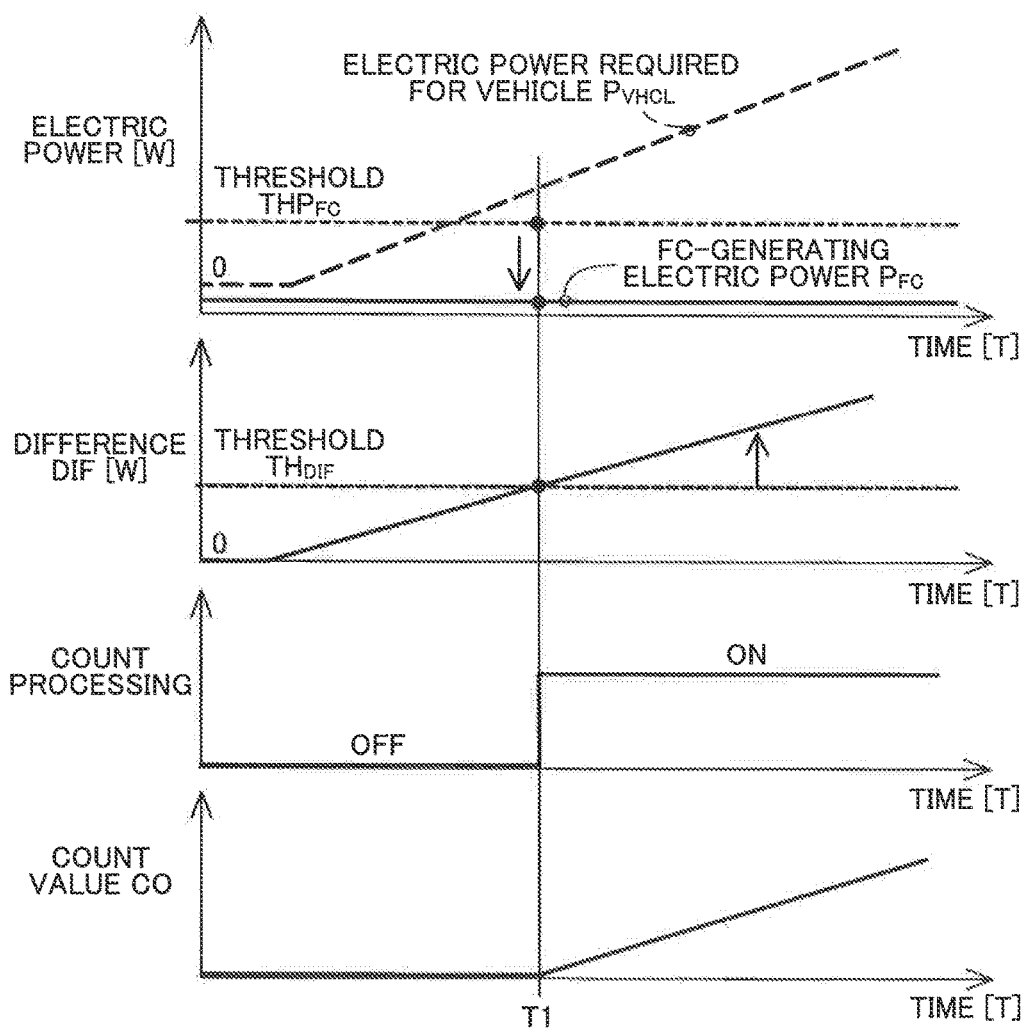
FIG. 10 is a timing chart illustrating a state of a fuel cell vehicle according to a fifth embodiment.

FIG. 10 is a timing chart illustrating an example of a state of a fuel cell vehicle 10D according to the fifth embodiment. FIG. 10 illustrates examples of time series variations in the electric power required for the vehicle $P_{VHCL}$, the FC-generating electric power $P_{FC}$, the difference DIF, the execution or non-execution of count processing, and a count value CO. During the torque shock avoidance control, the PM-ECU 181D according to the fifth embodiment performs the "count processing" for counting the length of time that elapses from the satisfaction of the "condition for the occurrence of the torque shock during acceleration". Herein, the FC-generating electric power $P_{FC}$ becoming equal to or less than the threshold $THP_{FC}$ and the difference DIF becoming at least the $TH_{DIF}$ is set as the "condition for the occurrence of the torque shock during acceleration" as in the fourth embodiment. When this condition is determined to be satisfied at the point in time of T1, the PM-ECU 181D initiates the count processing along with the torque shock avoidance control. Herein, the count value CO that is obtained as a result of the count processing is directly proportional to the length of time that elapses from the satisfaction of the "condition for the occurrence of the torque shock during acceleration". The PM-ECU 181D applies the rate limit to the calculated electric power required for the vehicle $P_{VHCL}$ by using the rate value RD correlated with the count value CO.

Figure 11:
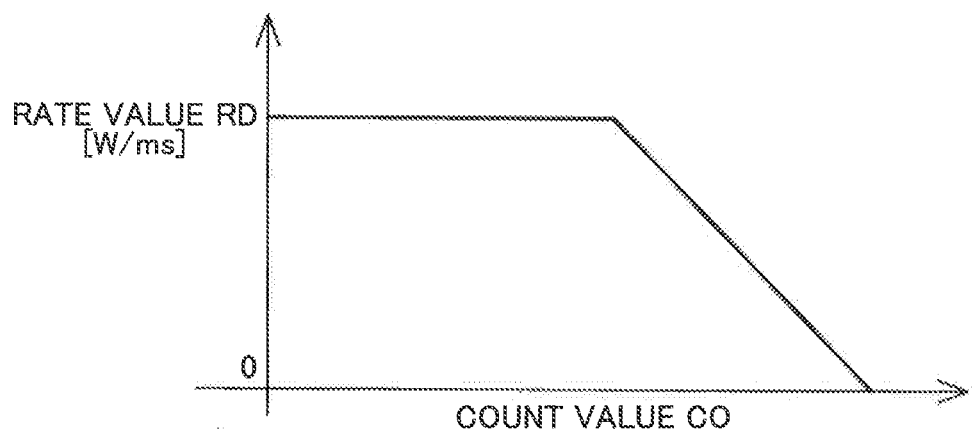
FIG. 11 is an explanatory drawing illustrating an example of a relationship between a count value and a rate value according to the fifth embodiment.

FIG. 11 is an explanatory drawing illustrating an example of a relationship between the count value CO and the rate value RD according to the fifth embodiment. The PM-ECU 181D, which is provided with a map corresponding to FIG. 11, calculates the rate value RD from the count value CO obtained as a result of the count processing and the map corresponding to FIG. 11. Then, the PM-ECU 181D applies the rate limit to the electric power required for the vehicle $P_{VHCL}$ by using the calculated rate value RD. In other words, the calculated electric power required for the vehicle $P_{VHCL}$ is substituted with the FC-generating electric power $P_{FC}$ and is raised at the rate value (variable value) RD set from the value. The calculated rate value (variable value) RD may be subtracted from the calculated electric power required for the vehicle $P_{VHCL}$. According to this configuration, the rate value RD can be increased when, for example, an increase in the FC-generating electric power $P_{FC}$ is initiated by an increase in the length of time that elapses from the satisfaction of the "condition for the occurrence of the torque shock during acceleration" and the count value CO is low. Accordingly, the deterioration of the sense of acceleration regarding the vehicle attributable to an excessive decrease in the electric power required for the vehicle $P_{VHCL}$ can be suppressed by the application of the rate limit to the electric power required for the vehicle $P_{VHCL}$.

A PM-ECU 181E according to a sixth embodiment executes the torque shock avoidance control and the count processing as is the case with that of the fifth embodiment. According to the description of the fifth embodiment, the count value CO is directly proportional to the elapsed time. However, the sixth embodiment is configured for the increment (count-up amount CU) in the count value CO to change depending on the difference DIF. Except for this point, the sixth embodiment is identical in configuration to the fifth embodiment.

Figure 12:
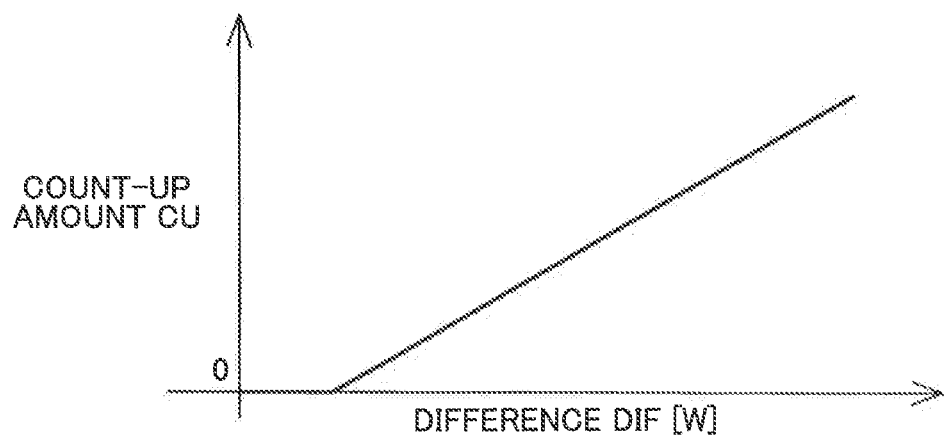
FIG. 12 is an explanatory drawing illustrating a relationship between a difference and a count-up amount according to a sixth embodiment.

FIG. 12 is an explanatory drawing illustrating an example of a relationship between the difference DIF and the count-up amount CU according to the sixth embodiment. This embodiment is configured for the count-up amount CU to increase as the difference DIF increases. The PM-ECU 181E, which is provided with a map corresponding to FIG.

12, calculates the count-up amount CU from the difference DIF and the map corresponding to FIG. 12 when the count processing is initiated. Then, the count value CO is increased by the calculated count-up amount CU. According to this configuration, the count value CO can be quickly increased when, for example, the electric power required for the vehicle $P_{VHCL}$ rises quickly. Accordingly, the rate value RD can be decreased when the FC-generating electric power $P_{FC}$ increases and the count value CO decreases thereafter.

A PM-ECU 181F according to a seventh embodiment executes the torque shock avoidance control as is the case with that of the fourth embodiment. According to the description of the fourth embodiment, the electric power required for the vehicle $R_{VHCL}$ is corrected by the application of the rate limit to the electric power required for the vehicle $P_{VHCL}$. However, the seventh embodiment is configured to allow the electric power required for the vehicle $P_{VHCL}$ to be corrected by another method. Except for this point, the seventh embodiment is identical in configuration to the fourth embodiment.

Figure 13:
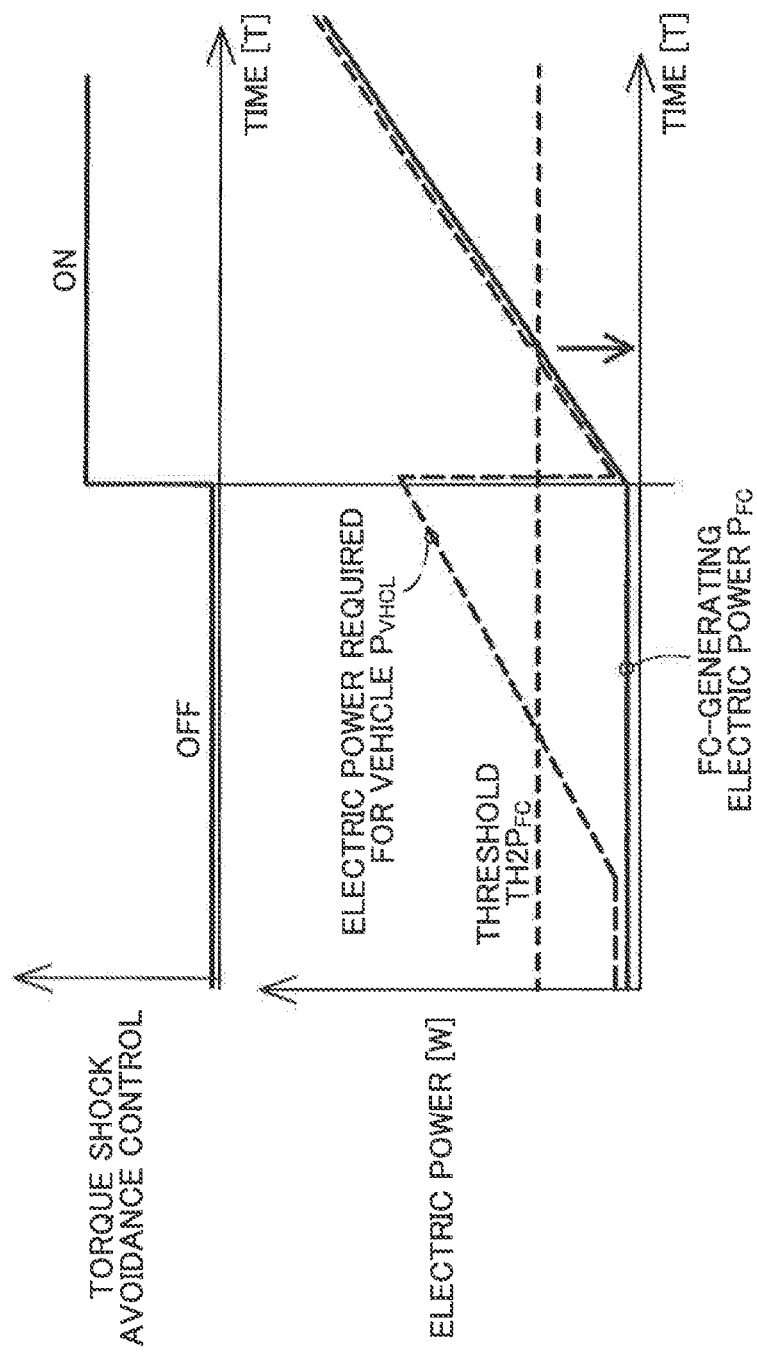
FIG. 13 is a timing chart illustrating a state of a fuel cell vehicle according to a seventh embodiment.

FIG. 13 is a timing chart illustrating an example of a state of a fuel cell vehicle 10F according to the seventh embodiment. FIG. 13 illustrates examples of time series variations in the execution or non-execution of the torque shock avoidance control, the electric power required for the vehicle $P_{VHCL}$, and the FC-generating electric power $P_{FC}$. During the torque shock avoidance control, the PM-ECU 181F according to the seventh embodiment switches the methods for correcting the electric power required for the vehicle $P_{VHCL}$ depending on whether or not the FC-generating electric power $P_{FC}$ is equal to or less than a second threshold $TH2P_{FC}$. Specifically, the PM-ECU 181F according to the seventh embodiment has a value that is obtained by performing the rate processing on the FC-generating electric power $P_{FC}$ as the post-correction electric power required for the vehicle $P_{VHCL}$, unlike in the fourth embodiment, in a case where the FC-generating electric power $P_{FC}$ is equal to or less than the second threshold $TH2P_{FC}$ during the torque shock avoidance control. In other words, the post-correction electric power required for the vehicle $P_{VHCL}$ is calculated from the FC-generating electric power $P_{FC}$ instead of being calculated from the rate value RD and the electric power required for the vehicle $P_{VHCL}$. The PM-ECU 181F according to the seventh embodiment calculates the post-correction electric power required for the vehicle $P_{VHCL}$ by applying the rate limit to the electric power required for the vehicle $P_{VHCL}$, as is the case with the fourth embodiment, in a case where the FC-generating electric power $P_{FC}$ exceeds the second threshold $TH2P_{FC}$ during the torque shock avoidance control. In this embodiment, the second threshold $TH2P_{FC}$ is less than the threshold $THP_{FC}$ that is included in the "condition for the occurrence of the torque shock during acceleration" ($THP_{FC} > TH2P_{FC}$). According to this configuration, the electric power required for the vehicle $P_{VHCL}$ that has a reduced value is calculated by the use of the value of the FC-generating electric power $P_{FC}$, and thus the calculation time can be shorter than in a case where the post-correction electric power required for the vehicle $P_{VHCL}$ is calculated by the application of the rate limit to the electric power required for the vehicle $P_{VHCL}$. Accordingly, the occurrence of the torque shock attributable to a delayed control can be suppressed.

The invention is not limited to the embodiments described above. Instead, the invention can be carried out in various aspects without departing from the spirit of the invention. For example, the invention can be modified as follows.

The configurations of the first to seventh embodiments can be appropriately combined with each other. For example, the configuration of the third embodiment and the configuration of the fourth embodiment may be combined with each other. In this case, the PM-ECU executes the correction processing for correcting the value of the electric power required for ACP driving $P_{RQ}$ in a case where the secondary battery 140 can still be charged and executes the torque shock avoidance control when the condition for the occurrence of the torque shock during acceleration is satisfied.

The fuel cell 110 according to the first to seventh embodiments receives the supply of oxygen from the air compressor (ACP) 138. However, a pump other than the air compressor may be means for supplying oxygen to the fuel cell 110. In the first to seventh embodiments, the electric power required for ACP driving $P_{RQ}$ is the electric power that is required for the ACP 138 to be put into the driving state correlated with the accelerator torque demand $T_{ACC}$. However, the electric power required for ACP driving $P_{RQ}$ may include electric power other than the electric power required for the driving of the ACP 138, examples of which include electric power required for the driving of a valve.

What is claimed is:

1. A fuel cell system mounted in a vehicle, the fuel cell system comprising:
   a fuel cell supplying electric power to a motor driving the vehicle;
   a pump supplying oxygen to the fuel cell;
   an accelerator position detection unit detecting an accelerator depression amount of the vehicle;
   a control unit calculating electric power required to be generated by the fuel cell and electric power required for driving of the pump based on the accelerator depression amount and controlling the pump based on the electric power required for the driving,
   wherein the control unit calculates the electric power required for the driving such that a rate of increase in the electric power required for the driving exceeds a rate of increase in the electric power required to be generated when the calculated electric power required to be generated increases; and
   a secondary battery supplying electric power to the motor,
   wherein the control unit corrects a value of the electric power required for the driving by adding, to the electric power required for the driving calculated based on the accelerator depression amount, electric power used for charging of the secondary battery and calculated by use of an upper limit value of charging electric power set in accordance with temperature and an electric power storage amount of the secondary battery.

2. The fuel cell system according to claim 1,
   wherein the control unit corrects a value of the electric power required for the driving by adding, to the electric power required for the driving calculated based on the accelerator depression amount, electric power used for compensating for lagging of a rotational speed of the motor behind the accelerator depression amount attributable to a vehicle weight of the vehicle and a rolling resistance of the vehicle and calculated by use of values set in advance as values respectively equivalent to the vehicle weight and the rolling resistance.

3. The fuel cell system according to claim 1,
   wherein the control unit corrects a value of the electric power required to be generated such that, in a case where a difference between the electric power required to be generated and electric power actually generated by the fuel cell is equal to or greater than a first threshold and the electric power actually generated is equal to or less than a second threshold, the difference decreases with respect to the electric power required to be generated calculated based on the accelerator depression amount.

4. A vehicle comprising:
the fuel cell system according to claim 1; and
a motor driving the vehicle by using electric power supplied from the fuel cell system.

5. A control method for a fuel cell system mounted in a vehicle, the fuel cell system including a fuel cell supplying electric power to a motor driving the vehicle, a pump supplying oxygen to the fuel cell, and a secondary battery supplying electric power to the motor, the control method comprising:
detecting an accelerator depression amount of the vehicle;
calculating electric power required to be generated by the fuel cell and electric power required for driving of the pump based on the accelerator depression amount and controlling the pump based on the electric power required for the driving;
calculating the electric power required for the driving such that a rate of increase in the electric power required for the driving exceeds a rate of increase in the electric power required to be generated when the calculated electric power required to be generated increases; and
correcting a value of the electric power required for the driving by adding, to the electric power required for the driving calculated based on the accelerator depression amount, electric power used for charging of the secondary battery and calculated by use of an upper limit value of charging electric power set in accordance with temperature and an electric power storage amount of the secondary battery.

6. A fuel cell system mounted in a vehicle, the fuel cell system comprising:
a fuel cell supplying electric power to a motor driving the vehicle;
a pump supplying oxygen to the fuel cell;
an accelerator position detection unit detecting an accelerator depression amount of the vehicle; and
a control unit calculating electric power required to be generated by the fuel cell and electric power required for driving of the pump based on the accelerator depression amount and controlling the pump based on the electric power required for the driving,
wherein the control unit calculates the electric power required for the driving such that a rate of increase in the electric power required for the driving exceeds a rate of increase in the electric power required to be generated when the calculated electric power required to be generated increases, and
wherein the control unit corrects a value of the electric power required to be generated such that, in a case where a difference between the electric power required to be generated and electric power actually generated by the fuel cell is equal to or greater than a first threshold and the electric power actually generated is equal to or less than a second threshold, the difference decreases with respect to the electric power required to be generated calculated based on the accelerator depression amount.

* * * * *